April 30, 1963 R. J. GORSKY 3,087,590
ONE-WAY DEVICE
Filed Nov. 1, 1960
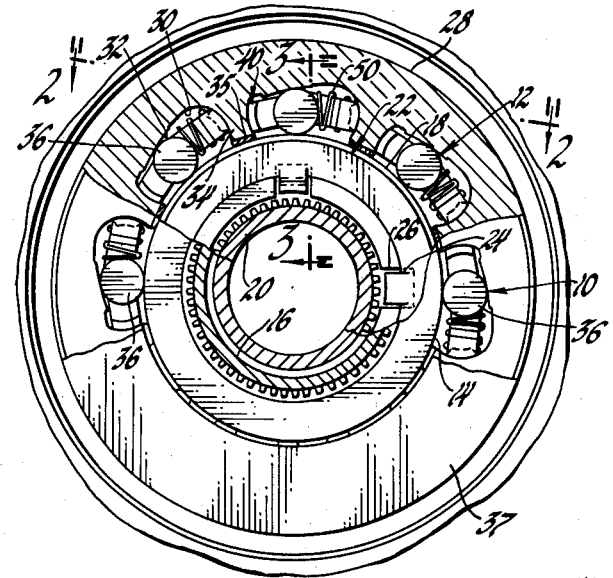
INVENTOR.
Rudolph J. Gorsky
BY
Hugh L. Fisher
ATTORNEY United States Patent Office 3,087,590
Patented Apr. 30, 1963

3,087,590
ONE-WAY DEVICE
Rudolph J. Gorsky, Fenton, Mich., assignor to General Motors Corporation, Detroit, Mich., a corporation of Delaware
Filed Nov. 1, 1960, Ser. No. 66,571
11 Claims. (Cl. 192—45)

This invention relates to improvements in one-way devices of the type that may be employed either as unidirectional clutches or brakes.

In general, one-way devices, determined by the application and the torque demands, involve numerous small parts such as individual wedging elements and energizing springs. Necessarily, the assembly of these small parts is time-consuming and the incorporation of the assembled device into an installation requires care or one of the parts may become displaced and require a time-consuming re-assembly. Another factor is transportation of the assembled units from the point of assembly to the installation station. Again, the small parts can become displaced from the assembly. For these reasons, proposals have been offered for facilitating both the assembly and transportation of these units, but such proposals often overlook the requirements of accepted mass production practices, either overlooking the need for quick build-up as well as installation, or comprising as to the operating efficiency of the unit.

It is therefore proposed by the invention to provide a novel one-way device that is particularly suited for build-up in sub-assembly form and that is easily completed and installed in a final assembly with a minimum of effort, and without any sacrifice in operating efficiency. Moreover, the novel one-way device incorporates features that contribute to the increase in the operational effectiveness. More particularly, and in accordance with the invention, individual cages for each wedging device are provided, such being retained within one of the races for the device so as to produce a compact sub-assembly.

Additionally, the invention offers a unique arrangement for retaining the foregoing cage within one of the races and further affords protection against damage to a biasing element used for energizing the wedging elements in the event the wedging element is for some reason forcibly ejected from the wedging position.

Another aim of the invention is to afford a construction wherein one-way devices may be placed side by side with the wedging elements of each separated by the novel construction afforded by the invention.

The foregoing and other objects and advantages of the invention will be apparent from the following description and the accompanying drawings in which:

FIGURE 1 is a view in partial section of a pair of one-way devices embodying the principles of the invention;

FIGURE 2 is a sectional view of the devices taken along line 2—2 of FIGURE 1;

FIGURE 3 is another sectional view of the devices taken along line 3—3, also of FIGURE 1;

FIGURE 4 is a sectional view of one of the devices taken along line 4—4 of FIGURE 2; and FIGURES 5 and 6 are views similar to that of FIGURE 4 and show modifications of the FIGURE 4 construction.

Referring now to the drawings in detail, and first to FIGURES 1 and 3, the two one-way devices are designated generally by the numerals 10 and 12 and as shown in FIGURE 3 are arranged in side by side relationship, the construction facilitating this disposition as will become apparent. The device 10 has an inner race 14 splined or otherwise drive connected to a shaft 16, whereas the device 12 has an inner race 18 drive connected to a shaft 20. Separating the races 14 and 18 is a thrust washer 22 made revolvable with inner race 18 by a connection therebetween furnished by inturned tangs 24 and corresponding notches 26 in the race 18. The devices 10 and 12 in the embodiment displayed have a common outer race 28, which has a series of arcuate recesses therein as cam openings 30 defined by cam surfaces 32 and cam feet 34. The ends of the cam feet 34 are provided with suitable bearing surfaces 35. In this way the concentricity between the races is maintained as further disclosed in the application S.N. 56,424 to Rudolph J. Gorsky, filed September 16, 1960 and entitled, One-Way Device. Wedging elements as rollers 36 are positioned within each of the cam openings 30 and are retained therein by side rings 37 and 38.

As so far described, and with the arrangement of the cam openings 30 depicted in FIGURE 1, the inner races 14 and 18 are prevented from revolving in a counterclockwise direction faster than the outer race 28, this being due to the movement of the rollers 36 to the depicted wedging position.

The devices 10 and 12 as will be understood by those versed in the art can be employed either as unidirectional brakes or clutches. If performing as a brake, the outer race 28 may be held or the inner races 14 and 18 may be restrained from rotation in any appropriate way. As clutches, either the inner races 14 and 18 may serve as inputs while the outer race 28 functions as an output, or the outer race 28 may become the input and the inner races 14 and 18, the outputs. Also, one device may be a brake and the other a clutch. These choices, of course, will be determined by the use made of the one-way devices 10 and 12.

As best shown in FIGURE 2, the cam openings 30 have positioned therein somewhat U-shaped cages 40 respectively provided with side walls 42 in abutting relation and having legs 44 and 46 extending outwardly therefrom so as to provide access to the cage interior. The leg 44 is made flexible and prior to the insertion of the cage 40 into the cam opening 30 will be in a position outwardly from that shown. Therefore, when the cage 40 is installed into the cam opening 30, the leg 44 will be flexed or deformed thereby providing a friction fit that retains the cage 40 in the desired position. Additionally, and this is best shown in FIGURE 4, the legs 44 and 46 are made arcuate so as to conform to the corresponding contour of the sides of the cam openings 30. Consequently, the cages 40 are also prevented from creeping radially inwardly from the outer race 28.

Again referring to FIGURE 2, the leg 46 is provided with a cavity or indentation 48 so as to provide an enclosure for biasing elements as energizing springs 50 and is also furnished with shoulders 52. These shoulders 52 are substantially aligned so that if for any reason, the rollers 36 should be forcibly ejected from the wedging position and against the springs 50, the rollers 36 will strike the shoulders 52. This prevents the springs 50 from being compressed beyond a safe limit, which could break the springs 50 or cause their permitted stress to be exceeded so that they could no longer provide the proper bias. Moreover, the two spaced and aligned shoulders prevent the rollers 36 from cocking and becoming jammed into a position that would prevent the devices 10 and 12 from performing properly.

By having the side walls 42 of the cages 40 in abutting relation, the opposite rollers 36 for the two devices 10 and 12 are prevented from rubbing against each other and disrupting their normal functions; for example, such rubbing could cause the rollers 36 of one or both of the one-way devices to be moved out of or into the wedging position at the wrong time and possibly produce irreparable damage to the entire unit.

The energizing springs 50 can be self-retaining and this is achieved as seen in FIGURE 4 by having the angular disposition of the springs 50 such that the force exerted thereby acts outwardly, or toward the outer race 28. Otherwise, if this force were downward, the springs 50 could conceivably creep downwardly and into engagement with the inner races 14 and 18. As a result, rubbing would take place and cause damage either to the springs 50, the inner races 14 and 18, or both. Also, if preferred, and again as seen in FIGURE 4, the end of the spring 50 can be inturned, as at 54, so as to further insure that the springs 50 do not drop downwardly toward the inner races 14 and 18. As an alternative, the springs 50 can in any suitable way be attached to the edge of the cages 40.

FIGURES 5 and 6 illustrate alternative ways of retaining the cages 40 within the cam openings 30. In FIGURE 5, the cam openings 30 are provided at their ends and along the edges of the cam feet 34 with shoulders or steps 55 and 56. Hence, when the cage 40′ is in position, cage 40′ is prevented from moving radially inwardly with respect to the outer race 28. Also, the legs 44′ and 46′ do not need to be arcuate but can be made straight. In FIGURE 6, only one step 58 is required for the cage 40″, this being possible because of the inclination of the sides of the cam feet 34. Again, with this construction, the legs 44″ and 46″, may be made with straight edges.

The cages 40 serve another desirable function in that they permit build-up of the devices 10 and 12 in subassembly form. For example, and considering FIGURE 4, the cages 40 may have both the spring 50 and the roller 36 installed therein so that the roller 36 is biased against the arcuate leg 44, this contour being similar to that of the roller 36. A further build-up is possible by including the outer race 28. For this sub-assembly, the cages 40 would be positioned within the cam openings 30 in the outer race 28 and the rollers 36 and springs 50 installed so that the roller 36 would be entrapped between the cam surface 32 and the leg 44 of the cage 40.

As can now be appreciated, the devices 10 and 12 are especially suited for side by side positioning. The cages 40 separate the rollers 36 so that they cannot rub and interfere with the operation of each other and also the inner races 14 and 18 are kept apart by the thrust washer 22. Therefore, the fore and aft movement of the races 14 and 18 cannot produce side loading of the rollers 36. In other words, the thrust force from fore and aft movement of the inner races 14 and 18 does not cause the rollers 36 to be subjected to a side load, which could not only produce excessive wear but could cause the device to malfunction in moving to and from the wedging position.

Also, the construction of the cages 40 protects the springs 50 from damage due to forcible ejection or "popout" of the rollers 36 from the wedging position, and facilitates the formation of sub-assemblies that are particularly suited to mass production techniques.

The invention is to be limited only by the following claims:

1. In a one-way device, the combination of inner and outer races, one of the races having an arcuate recess therein provided with spaced end walls and a cam surface therebetween, a cage positioned wholly within the recess, the cage being so arranged as to deform when positioned within the recess and thereby afford a press fit against said end walls for retaining the cage within the recess, a wedging element situated within the cage, and a biasing element urging the wedging device to the wedging position relative to the cam surface so as to prevent relative rotation between the races in one direction.

2. In a one-way device, the combination of inner and outer races, one of the races having a series of recesses therein each provided with a cam surface, a plurality of cages one positioned within each recess, the cages being so arranged as to deform when positioned within the recess and thereby afford a press fit therewith for retaining the cages within each recess, the cages also including a stop thereon, a wedging element situated within each cage, and a plurality of biasing elements each interposed between the cage and the respective wedging element and also positioned adjacent the cage stop so that the extent of compression of each biasing element by the respective wedging element is limited by the stop, the biasing elements each urging the respective wedging element to the wedging position relative to the cam surface so as to prevent relative rotation between the races in one direction.

3. In a one-way device sub-assembly, the combination of a race including a series of cam openings therein provided with cam surfaces, a plurality of cages each adapted to be retained within one of the cam openings, a wedging element situated within each cage, a plurality of biasing elements each engaging one side of the respective cage and urging the respective wedging element against both the cam surface and the opposite side of the cage so as to entrap the wedging element within the sub-assembly.

4. In a one-way device sub-assembly, the combination of a race having a cam opening therein, a cage positioned within the cam opening, the cage including a resilient portion deformable upon installation of the cage within the cam opening so as to provide a friction fit for retaining the cage in place within the cam opening, a wedging element confined within the cage, and a bias element engaging one side of the cage and urging the wedging element against both the cam surface and the opposite side of the cage so as to entrap the wedging element within the sub-assembly.

5. In a one-way device sub-assembly, the combination of a race having a cam opening therein, a cage positioned within the cam opening, the cage having a resilient portion deformable upon installation of the cage within the cam opening so as to provide a friction fit for retaining the cage in position with the cam opening, the cage also including an indented portion, a wedging element situated within the cage, and a biasing element positioned within the indented portion of the cage and arranged so as to urge the wedging element against the opposite side of the cage and thereby entrap the wedging element within the sub-assembly.

6. In a one-way device sub-assembly, the combination of a race having a cam opening therein, the race having a shoulder extending into the cam opening, a cage positioned within the cam opening and abutting the shoulder, the cage also being so arranged as to deform when positioned within the recess and thereby afford a press fit therewith for coacting with the shoulder to retain the cage within the cam opening, a wedging element confined within the cage, and a biasing element urging the wedging element against a side of the cage so as to entrap the wedging element within the sub-assembly.

7. In combination, a pair of one-way devices positioned side by side each having inner and outer races, one of the races for each device having an arcuate recess provided with spaced end walls and with a cam surface therebetween, an arcuate cage completely within each recess, a wedging element situated within each cage, a resilient biasing element interposed between an end of each cage and the respective wedging element as to urge the wedging element toward the wedging position in which relative rotation between the races in one direction is prevented, the cages of each device being respectively provided with opposing interengageable walls to prevent opposite wedging elements from contacting each other.

8. In a one-way device, the combination of inner and outer races, one of the races having an arcuate recess therein provided with a pair of spaced end walls and a cam surface therebetween, a cage positioned wholly within the recess and engaging said end walls, a flexible cage leg deformably fitted against one of the end walls to retain the cage in said recess, the cage having a shoulder spaced from one of the end walls, a wedging element in the cage, a resiliently compressible biasing element between the cage and the wedging element and urging said wedging element into one-way driving relation between said surface and one of said races, and said shoulder limiting the extent of compression of the biasing element by the wedging element.

9. In a one-way device, the combination of inner and outer races, one of the races having an arcuate recess therein provided intermediate its length with a cam surface, said recess having spaced end walls, an arcuate cage positioned wholly within the recess, a resilient end portion on the cage deformably engaged against one of the end walls to demountably retain the cage within said recess, a wedging element within the cage, an indented cage portion providing shoulders at one end of the cage to limit the movement of the wedging element in one direction in the cage, and a resilient biasing element seated within the indented portion and arranged to be compressed by the wedging element only to the extent allowed by said shoulders, the biasing element normally urging the wedging element into wedging engagement between the cam surface and one of the races to prevent relative rotation between the races in one direction.

10. In combination, a pair of one-way devices positioned side by side, each having inner and outer races, one of the races for each device having an arcuate recess provided with spaced end walls and with a cam surface therebetween, an arcuate cage retained completely within each recess, a wedging element within each cage, a resilient biasing element interposed between an end of each cage and a wedging element to urge said wedging element into a wedging position between a cam surface and one of said races in which relative rotation between the races in one direction is prevented, interengageable side walls on adjacent cages to prevent opposite wedging elements from engaging each other, and a thrust washer axially interposed between an adjacent pair of said races and rotatable with one of said races.

11. In combination, a pair of one-way devices positioned side by side, each of said devices having inner and outer races, one of the races for each device having an arcuate recess provided with end walls and having a cam surface therein, an arcuate cage located completely within each recess, the cage having a resilient portion deformably engaging one of said end walls to retain the cage in the recess, a wedging element within each cage, a resilient biasing element urging each wedging element towards a wedging position between one of the races and a cam surface to prevent relative rotation between the races in one direction, the cages of each device being respectively provided with interengageable opposing side walls which prevent the wedging element of one device from engaging the wedging element of the other device.

References Cited in the file of this patent

UNITED STATES PATENTS

| | | |
|---|---|---|
| 2,082,842 | Marland | June 8, 1937 |
| 2,902,125 | House et al. | Sept. 1, 1959 |
| 2,973,847 | Stockton | Mar. 7, 1961 |
| 3,014,567 | Stockton | Dec. 26, 1961 |

FOREIGN PATENTS

| | | |
|---|---|---|
| 820,689 | Germany | Nov. 12, 1951 |
| 849,204 | Germany | Sept. 11, 1952 |